United States Patent [19]
Hughes et al.

[11] Patent Number: 5,678,473
[45] Date of Patent: Oct. 21, 1997

[54] THREE-STAGE BARBECUE COOKER

[76] Inventors: Sean Hughes, 16925 S. Leclaire, Oak Forest, Ill. 60452; Raymond J. Polino, 10630 S. Spaulding, Chicago, Ill. 60655; Aldo G. Beltrame, 15412 Walnut, Oak Forest, Ill. 10452

[21] Appl. No.: 587,154

[22] Filed: Jan. 16, 1996

[51] Int. Cl.⁶ .............................. A23L 1/00; A47J 37/00; A47J 37/04; A47J 37/10
[52] U.S. Cl. .......................... 99/345; 99/352; 99/386; 99/400; 99/443 C; 99/446; 99/494
[58] Field of Search .................. 99/345–347, 352–355, 99/372–375, 385, 386, 400, 401, 426, 427, 443 R, 443 C, 444–446, 448, 494, 516, 536, 534, 477–479; 126/25 R, 21 A; 219/388; 426/510, 523

[56] References Cited

U.S. PATENT DOCUMENTS

| | | |
|---|---|---|
| D. 284,256 | 6/1986 | Moncrief .............................. D7/334 |
| 1,476,215 | 12/1923 | Pace . |
| 1,638,452 | 8/1927 | Panajiotaros et al. . |
| 3,450,027 | 6/1969 | Lohr et al. . |
| 3,460,462 | 8/1969 | Gager . |
| 3,499,380 | 3/1970 | Gongwer . |
| 4,103,606 | 8/1978 | Gitcho . |
| 4,453,457 | 6/1984 | Gongwer et al. . |
| 4,548,130 | 10/1985 | Diener et al. . |
| 4,599,938 | 7/1986 | Gongwer ........................... 99/446 |
| 4,600,596 | 7/1986 | Gongwer et al. .................. 426/523 |
| 4,944,282 | 7/1990 | Aguiar et al. ..................... 99/395 |
| 4,947,741 | 8/1990 | Gongwer . |
| 4,962,695 | 10/1990 | Northrup, Jr. . |
| 4,986,174 | 1/1991 | Gongwer ........................... 99/345 |
| 5,052,287 | 10/1991 | Chiang . |
| 5,205,208 | 4/1993 | Gongwer ........................ 99/386 X |
| 5,542,345 | 8/1996 | Gongwer ........................... 99/345 |

*Primary Examiner*—Timothy F. Simone
*Attorney, Agent, or Firm*—Hill, Steadman & Simpson

[57] ABSTRACT

A three-stage cooking apparatus and method for automatically cooking food products are provided. The three-stage cooking apparatus has a housing, a first conveyor within the housing for transporting a food product to be cooked thereon, a heating element located above the first conveyor and a condiment dipper located at an end of the first conveyor. The condiment dipper is constructed and arranged to receive the food products from the first conveyor for dipping the food products in a condiment contained therein. A second conveyor is located at an output of the condiment dipper to receive dipped food products thereon. A second heating element may be located within the housing below the first conveyor and above the second conveyor to cook the food products on each conveyor. Another heating element may be located beneath the second conveyor to cook the food products while the same are traveling on the second conveyor.

18 Claims, 2 Drawing Sheets

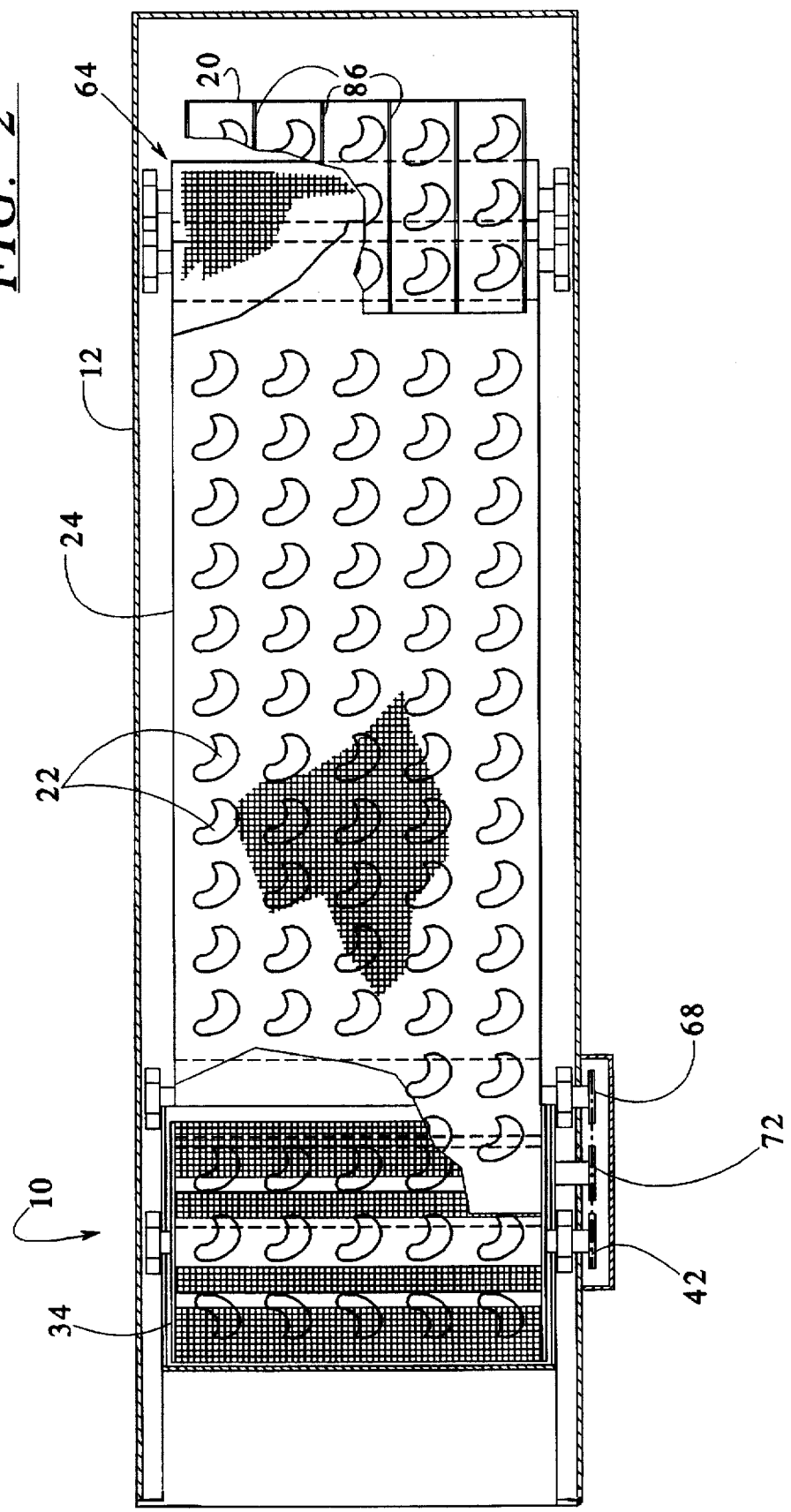

5,678,473

THREE-STAGE BARBECUE COOKER

BACKGROUND OF THE INVENTION

The present invention relates generally to a cooking apparatus and more specifically to a method and associated apparatus for performing a three-stage barbecue cooking operation carried out in an automated manner.

It is generally known to cook foods in a device including a conveying type mechanism on which a carrier for the food is transported. It is also known in the art to dip the food into a sauce or the like to season the item to be cooked during the transporting process. Particularly relevant in this regard, are U.S. Pat. Nos. 3,499,380 to Gongwer and 4,103,606 to Gitcho. However, both of these patents have the problem of including a separate enclosed basket-type element on the conveyor to carry the food product. Such a basket is shown in FIG. 9 of the '606 patent. The basket elements enclose the product that is to be cooked and dipped in the sauce. Therefore, the basket is dragged through the sauce with the product so that the food can be coated with the sauce. This leads to the undesirable result that the basket is continuously dipped into the sauce thereby contaminating the sauce each time it travels through the sauce. The sauce-coated basket is then subjected to heat during cooking which consequently bakes the sauce onto the basket. As a result, the baskets develop a build-up of baked-on sauce which inhibits performance of the device. It would, therefore, be advantageous to dip only the food to be seasoned rather than dipping and coating the food carrier element of the cooking apparatus.

Furthermore, each of the above-mentioned patents discloses indirect cooking of a food product. For example, the heating elements, which are usually in the form of hot coals, are placed at the base of the apparatus and heat the bottom level, but only indirectly heat the top level of a conveyor carrying the food. This cooking arrangement also has a disadvantage of unevenly cooking the food. Also, a longer cooking time is required to cook the food, due to the less direct heating.

Thus, a need has arisen for a method and apparatus to more efficiently cook and flavor a food product in a sauce or the like wherein the food product is cooked again after the food product has been dipped in the sauce.

SUMMARY OF THE INVENTION

To this end, the present invention provides a three-stage barbecue cooker method and apparatus in which meat or other food product is placed on a conveyor and is cooked thereon from two directions. The food is then transported to a condiment dipper which covers the food product in a condiment, and in a third step, the food product is dispensed back onto a conveyor and transported to cook the food again. Finally, the food is deposited, fully cooked and seasoned, at a receptacle on the cooker.

Specifically, in an embodiment, the present invention provides a three-stage cooking apparatus having a housing; a first conveying means for transporting a food product to be cooked thereon located within the housing, the first conveying means having a first end and a second end; a heating element located above the first conveying means; a condiment dipper located at the second end of the first conveying means, the condiment dipper being constructed and arranged to receive the food products from the first conveying means for dipping the food products in a condiment contained therein; a second conveying means located at an output of the condiment dipper constructed and arranged to receive dipped food products thereon; a second heating element located within the housing below the first conveying means and above the second conveying means to provide cooking of the food product on each conveying means; and another heating element located beneath the second conveying means constructed and arranged to cook the food products from below while the same are traveling on the second conveying means.

In an embodiment, the present invention provides a method for automatically cooking food products. The method has the steps of: providing a cooker having a first conveyor means, a condiment dipper located at an end of the first conveyor means, a second conveyor means located at an output of the condiment dipper, a plurality of heating elements located within the cooker to cook the food products while same are transported on the first conveying means and the second conveying means, and a receptacle at the end of the second conveying means for receiving the cooked food product; loading food products onto the first conveyor means; cooking the food products from above and below using the heating elements; transferring the partially cooked food products into the condiment dipper; coating the food products with a condiment in the condiment dipper; transferring the coated food products onto the second conveying means; cooking the food products from above and below using the heating elements; and dispensing the cooked food products from the cooker into the receptacle.

It is, therefore, an advantage of the present invention to provide a three-stage barbecue cooker apparatus having separate heating levels for cooking food on two sides on two different levels.

It is another advantage of the present invention to provide a metallic mesh conveyor that conducts heat such that a heating element can cook the food therethrough.

Another advantage of the present invention is to provide a three-stage barbecue cooker in which the food is directly placed on the transporting conveyors without a food carrier basket.

A further advantage of the present invention is that it provides that the food item is transported into the sauce or the like without a carrier basket being pulled through the sauce.

Yet another advantage of the present invention is to provide a three-stage barbecue cooker having an automatic sauce level maintenance system.

Still another advantage of the present invention is to provide a three-stage barbecue cooker providing faster cooking and thus requiring less space thereby providing a more compact barbecue cooker unit.

These and other advantages of the present invention will be described in and will be apparent from the detailed description of the presently preferred embodiments and from the drawings.

BRIEF DESCRIPTION OF THE DRAWINGS

FIG. 2 is a detail view of a conveyor of an embodiment of the three-stage barbecue cooker of the present invention.

DETAILED DESCRIPTION OF THE PRESENTLY PREFERRED EMBODIMENTS

Figure 1:
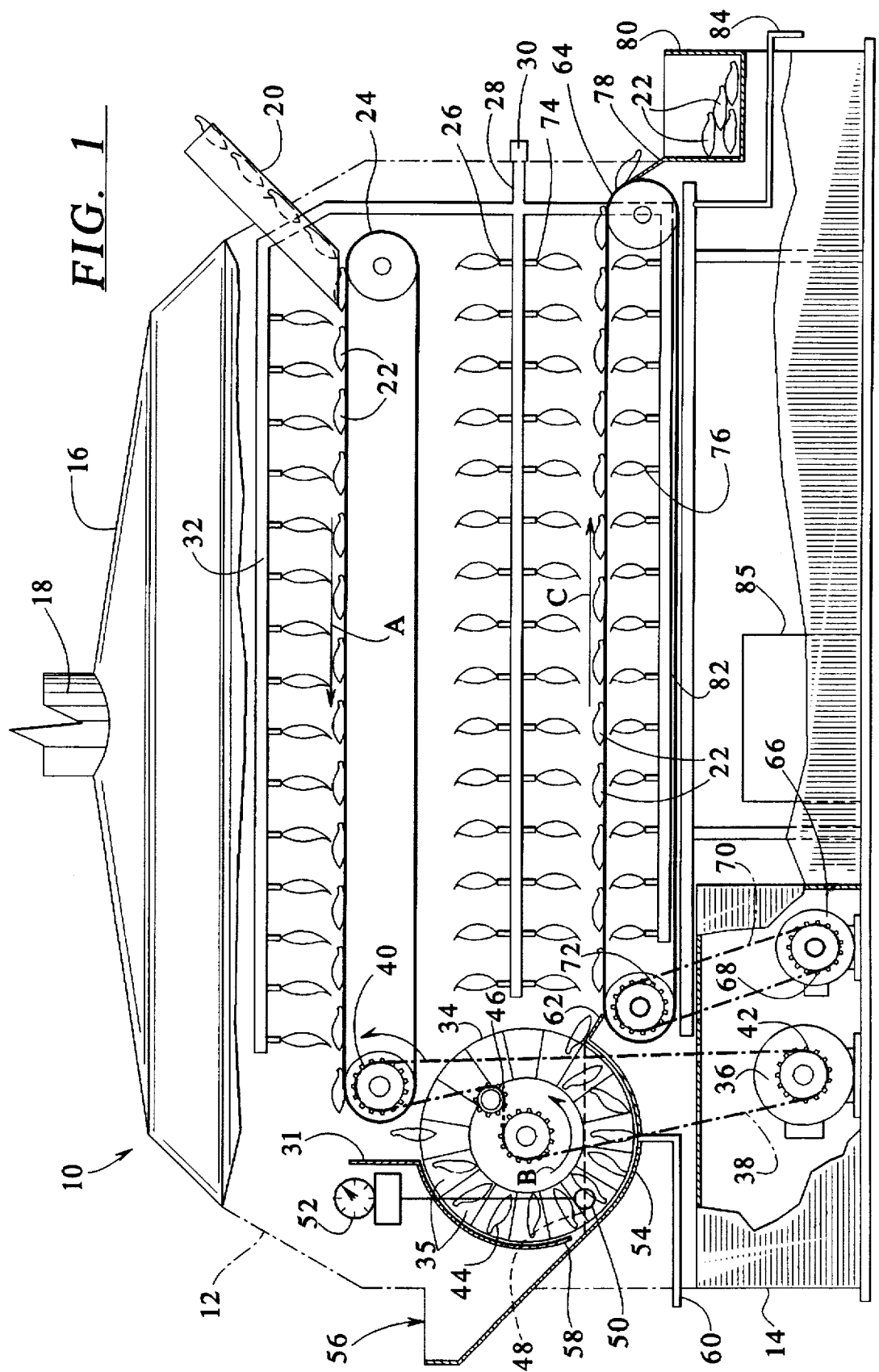
FIG. 1 is a side elevational view partially in cross section of an embodiment of a three-stage barbecue cooker of the present invention.

FIG. 1 shows an embodiment of a three-stage barbecue cooker of the present invention generally at 10. The cooker 10 has a body 12 including a base 14. The body 12 incorporates a hood 16 with a vent 18 for the release of smoke from the cooker 10.

Also illustrated in FIG. 1 is a loading magazine 20. A food product 22 to be cooked, for example, chicken wings and/or the like, is deposited into the magazine 20. The magazine 20 is arranged over a first conveying means 24 so that the food product 22 is evenly distributed over the first conveying means 24. The loading magazine 20 is described further below with reference to FIG. 2.

The first conveying means 24 is preferably constructed of a stainless steel wire mesh belt which is capable of conducting and transmitting heat therethrough from below. The food product 22 travels on the first conveying means 24 in a direction indicated by arrow A. In the embodiment illustrated, the food product 22 is cooked from below by a plurality of gas flames 26 connected to a gas pipe 28 having a fitting 30 to connect to a gas supply. The food product 22 is also cooked from above by an additional upper plurality of gas flames 32. Of course, other known heating elements may be implemented by those skilled in the art. As a result, the food product 22 is cooked on both sides while it travels on the first conveying means 24. The food product 22 is at least partially cooked by the time it reaches the end of the first conveying means 24.

At the end of the first conveying means 24, the food products 22 are then dropped off of the end of the first conveying means 24 into a condiment dipper 34. The condiment dipper 34 is preferably shaped like a paddle wheel. The dipper 34 has a plurality of compartments 35 to hold the food products 22 in a somewhat separated arrangement which provides a more even coating of a condiment 48. A deflector shield 31 is provided to prevent the food products 22 from falling too far off the edge of the first conveying means 24 and to also assist in directing the food products 22 into the dipper 34.

As illustrated in FIG. 1, the first conveying means 24 is driven by a motor 36 located in the base 14 of the cooker 10. A chain 38 is connected to a sprocket 40 on the first conveying means 24 and drives a sprocket 42 on the motor 36. The chain 38 also rotates the dipper 34 by means of a central sprocket 44 and an idler sprocket 46. As the dipper 34 rotates counter clockwise in the embodiment shown, as illustrated by arrow B, the food products 22 are drawn through a supply of the condiment 48. The condiment 48 can be, for example, a barbecue sauce, seasoning mixture, etc.

The supply of the condiment 48 may be accurately maintained at a predetermined level by a ball float 50 connected to a sensor 52. In this manner, the condiment 48 is accurately maintained in a dip trough 54. In an embodiment, the dip trough 54 is filled by inserting the condiment 48 into an opening 56. The condiment 48 enters the dip trough 54 through a channel 58 which is formed by the dip trough 54 and the deflecting shield 31.

A drain tube 60 is also provided for periodic cleaning of the dip trough 54. The drain tube 60 facilitates maintaining cleanliness of the cooker 10 and enables the cooker 10 to conform to health requirements. The dip trough 54 also has a dispensing ramp 62. As the food products 22 emerge from the condiment 48 contained in the dip trough 54, they are transferred from the dipper 34 onto the dispensing ramp 62 and subsequently deposited onto a second conveying means 64 for further cooking. The second conveying means 64 is driven by a second motor 66 via a drive sprocket 68 on the second motor 66. A second chain 70 is connected to a sprocket 72 on the second conveying means 64. The cooked food products 22 are thereby conveyed on the second conveying means 64 in a direction indicated by arrow C.

As illustrated, the gas pipe 28 has a second plurality of gas flame heating elements 74 which further cook the food products 22 therebelow. Also illustrated in FIG. 1 is a lower heating element 76. The lower heating element 76 additionally cooks the food products 22 from below the second conveying means 64 so that both sides of the food products 22 are cooked.

As a result of cooking on both sides on the two conveyors 24, 64, the food products 22 may be cooked much faster than in the prior art devices. In addition, since the food products 22 are cooked on both sides on two levels, less space is required for the conveying means, thereby providing a smaller device. Once the food products 22 reach the end of the second conveying means 64, the cooked food products 22 descend onto an exit ramp 78 and into a receiving bin 80. An operator can simply unload the bin 80 for a fresh supply of cooked food products 22.

A drip pan 82 is also illustrated in FIG. 1. The drip pan 82 collects grease and other run off of condiment 48 and other splattering resulting from the cooking process. The grease and other run off on the drip pan 82 may be drained via a drain tube 84 to keep the drip pan 82 relatively clean during the cooking process.

In an embodiment, a fire extinguishing means 85 is provided for safety. If an excessive flare up occurs within the cooker 10, the fire extinguishing means 85 activates to put out the flare up.

FIG. 2 illustrates a partially cut-away plan view of the three-stage barbecue cooker 10 of the present invention. The hood 16 has been removed for clarity. As illustrated, the loading magazine 20 is shown having five separate sections delineated by dividing walls 86 to better distribute the food products 22, i.e. chicken wings and/or the like, on the first conveying means 24. In the embodiment shown, five rows of food products 22 are illustrated. However, any number of food products 22 that would fit on the first conveying means 24 could be cooked at one time, as long as some space remains between the food products 22 so that even heating is possible.

Also illustrated is the first conveying means 24. As previously indicated, preferably the first conveying means 24 and the second conveying means 64 are constructed from stainless steel. Of course, other heat conducting materials may be implemented.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A three-stage cooking apparatus comprising:

a housing;

a first conveying means located within the housing for transporting a food product to be cooked thereon, the first conveying means having a first end and a second end;

a heating element located proximate to the first conveying means;

a dipper containing a condiment located at the second end of the first conveying means, said dipper being constructed and arranged to receive the food product from the first conveying means for dipping the food product in the condiment contained therein, the dipper having an output;

a second conveying means located at the output of the dipper constructed and arranged to receive dipped food product thereon, the second conveying means having a first end and a second end; and a second heating element located proximate the second conveying means constructed and arranged to cook the food product while the food product is traveling on the second conveying means.

2. The cooking apparatus of claim 1 further comprising:

a vent located on the top of the housing to release smoke generated from cooking of the food product therein.

3. The cooking apparatus of claim 1 further comprising:

a fire extinguishing means located within the housing.

4. The cooking apparatus of claim 1 further comprising:

a receptacle receiving the finished cooked food product, the receptacle located at the second end of the second conveying means.

5. The cooking apparatus of claim 1 further comprising:

a condiment filling inlet constructed and arranged to provide the condiment to the dipper.

6. The cooking apparatus of claim 1 further comprising:

a deflector shield located adjacent the dipper to direct the food products from the first conveying means into the dipper.

7. The cooking apparatus of claim 1 further comprising:

a condiment level detecting and control means for maintaining the condiment at a preselected level within the dipper.

8. The cooking apparatus of claim 7 further comprising:

a float located in the condiment and operatively connected to the condiment level detecting and control means; and a sensor connected to the float for measuring the condiment level.

9. The cooking apparatus of claim 1 further comprising:

a drip pan located beneath the second conveying means constructed and arranged to collect excess condiment and cooking by-products.

10. The cooking apparatus of claim 1 further comprising:

a third heating element located within the housing constructed and arranged to cook the food product while the food product is traveling on the first conveying means and the second conveying means.

11. The cooking apparatus of claim 1 further comprising:

a drain tube connected to the dipper.

12. The cooking apparatus of claim 1 further comprising:

a drive means connected to the first conveying means and the dipper for transporting product on the first conveying means and for rotating the dipper.

13. The cooking apparatus of claim 12 further comprising:

a sprocket connected to the drive means.

14. The cooking apparatus of claim 1 wherein the first conveying means is a stainless steel mesh conveyor belt.

15. The cooking apparatus of claim 1 further comprising:

separator bins to arrange the food products therein.

16. The cooking apparatus of claim 1 further comprising:

a loading magazine constructed and arranged at the first end of the first conveying means to load the food products.

17. The cooking apparatus of claim 16 further comprising:

separator means for directing the food products into rows before dispensing the food products onto the first conveying means.

18. The cooking apparatus of claim 1 further comprising:

a separate drive means for driving the second conveying means.

* * * * *